(12) United States Patent
Milne et al.

(10) Patent No.: US 11,070,930 B2
(45) Date of Patent: Jul. 20, 2021

(54) GENERATING PERSONALIZED END USER ROOM-RELATED TRANSFER FUNCTION (RRTF)

(71) Applicant: Sony Corporation, Tokyo (JP)

(72) Inventors: James R. Milne, Ramona, CA (US); Bibhudendu Mohapatra, San Diego, CA (US); Gregory Carlsson, Santee, CA (US); Tonni Sandager Larsen, San Diego, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/681,632

(22) Filed: Nov. 12, 2019

(65) Prior Publication Data

US 2021/0144506 A1 May 13, 2021

(51) Int. Cl.
*H04S 7/00* (2006.01)
*G06F 3/16* (2006.01)
(Continued)

(52) U.S. Cl.
CPC ............ *H04S 7/303* (2013.01); *G06F 3/0481* (2013.01); *G06F 3/04883* (2013.01);
(Continued)

(58) Field of Classification Search
CPC .. H04R 5/02; H04R 5/04; H04S 7/303; H04S 2420/01; G06F 3/0481; G06F 3/04883; G06F 3/165
(Continued)

(56) References Cited

U.S. PATENT DOCUMENTS 6,181,800 B1  1/2001 Lambrecht
6,795,556 B1  9/2004 Sibbald et al.
(Continued)

FOREIGN PATENT DOCUMENTS

CN  105027580 B  5/2017
CN  107172566 B  1/2019
(Continued)

OTHER PUBLICATIONS

Mohapatra et al., "Generating Personalized End User Head-Related Transfer Function (HRTF) from Generic HRTF", U.S. Appl. No. 16/662,995, Non-Final Office Action dated Apr. 29, 2020.
(Continued)

*Primary Examiner* — William A Jerez Lora
(74) *Attorney, Agent, or Firm* — John L. Rogitz

(57) ABSTRACT

A personalized room related transfer function (RRTF) for sound bars and speakers within a specific room is generated without the need for photographs of the listener's head or microphones in a headphone apparatus. A smart device aids the listener in creating his own RRTF by enabling the listener to select a general RRTF model based on the specific sound bar setup (e.g., sound bar; sound bar+subwoofer; sound bar+rear speakers+height; etc.) from a set of general RRTFs downloaded locally or from the cloud. A test signal is played from a specific driver of the sound bar, and the listener identifies a location at which he would like the perceived sound to originate. If the driver location signal and desired location are not the same, the app adjusts parameters and replays the test signal until the driver signal and the desired location are the same.

19 Claims, 10 Drawing Sheets

(51) Int. Cl.
  *G06F 3/0481*  (2013.01)
  *H04R 5/02*   (2006.01)
  *H04R 5/04*   (2006.01)
  *G06F 3/0488* (2013.01)

(52) U.S. Cl.
  CPC .............. *G06F 3/165* (2013.01); *H04R 5/02* (2013.01); *H04R 5/04* (2013.01); *H04S 2420/01* (2013.01)

(58) Field of Classification Search
  USPC ............................................ 381/1, 303, 310
  See application file for complete search history.

(56) References Cited

U.S. PATENT DOCUMENTS

| | | |
|---|---|---|
| 7,634,092 B2 | 12/2009 | McGrath |
| 7,720,229 B2 | 5/2010 | Duraiswami et al. |
| 7,840,019 B2 | 11/2010 | Slaney et al. |
| 8,452,036 B2 | 5/2013 | Sommer et al. |
| 8,489,371 B2 | 7/2013 | Guillon et al. |
| 8,503,682 B2 | 8/2013 | Fukui et al. |
| 8,520,857 B2 | 8/2013 | Fukui et al. |
| 8,787,584 B2 | 7/2014 | Nyström et al. |
| 9,030,545 B2 | 5/2015 | Pedersen |
| 9,101,279 B2 | 8/2015 | Ritchey et al. |
| 9,118,488 B2 | 8/2015 | Donaldson |
| 9,118,991 B2 | 8/2015 | Nystrom et al. |
| 9,167,368 B2 | 10/2015 | Jong et al. |
| 9,448,405 B2 | 9/2016 | Yamamoto |
| 9,544,706 B1 | 1/2017 | Hirst |
| 9,591,427 B1 | 3/2017 | Lyren et al. |
| 9,740,305 B2 | 8/2017 | Kabasawa et al. |
| 9,848,273 B1 | 12/2017 | Helwani et al. |
| 9,854,362 B1 | 12/2017 | Milne et al. |
| 9,900,722 B2 | 2/2018 | Bilinski et al. |
| 9,924,289 B2 | 3/2018 | Trivi et al. |
| 9,992,602 B1 | 6/2018 | Allen |
| 10,003,905 B1 | 6/2018 | Milne et al. |
| 10,149,089 B1 | 12/2018 | Edry et al. |
| 10,154,365 B2 | 12/2018 | Silva |
| 10,206,055 B1 | 2/2019 | Mindlin et al. |
| 10,492,018 B1 | 11/2019 | Allen |
| 2004/0091119 A1 | 5/2004 | Duraiswami et al. |
| 2006/0116930 A1 | 6/2006 | Goldstein |
| 2011/0137437 A1 | 6/2011 | Jonsson |
| 2012/0014528 A1 | 1/2012 | Wang |
| 2012/0201405 A1 | 8/2012 | Slamka et al. |
| 2013/0154930 A1 | 6/2013 | Xiang et al. |
| 2013/0169779 A1 | 7/2013 | Pedersen |
| 2013/0170679 A1 | 7/2013 | Nystrom et al. |
| 2013/0177166 A1* | 7/2013 | Agevik ............... H04R 3/00 381/74 |
| 2013/0208899 A1 | 8/2013 | Vincent et al. |
| 2014/0171195 A1 | 6/2014 | Searchfield et al. |
| 2014/0185847 A1 | 7/2014 | Gran et al. |
| 2015/0010160 A1 | 1/2015 | Udesen |
| 2015/0063610 A1 | 3/2015 | Mossner |
| 2015/0106475 A1 | 4/2015 | Tan et al. |
| 2015/0256613 A1 | 9/2015 | Walker et al. |
| 2015/0293655 A1 | 10/2015 | Tan |
| 2015/0347735 A1 | 12/2015 | Yamashita |
| 2016/0100268 A1 | 4/2016 | Stein et al. |
| 2016/0124707 A1 | 5/2016 | Ermilov et al. |
| 2016/0142848 A1 | 5/2016 | Saltwell |
| 2016/0269849 A1 | 9/2016 | Riggs et al. |
| 2017/0078820 A1* | 3/2017 | Brandenburg .......... H04S 7/301 |
| 2017/0094440 A1 | 3/2017 | Brown et al. |
| 2017/0332186 A1 | 11/2017 | Riggs et al. |
| 2018/0091921 A1 | 3/2018 | Silva |
| 2018/0136898 A1 | 5/2018 | Shi et al. |
| 2018/0139565 A1 | 5/2018 | Norris et al. |
| 2018/0249276 A1 | 8/2018 | Godfrey |
| 2018/0310115 A1* | 10/2018 | Romigh ................. H04S 3/008 |
| 2019/0007725 A1 | 1/2019 | Ferrer |
| 2019/0200159 A1* | 6/2019 | Park ........................ G10L 21/02 |
| 2019/0215637 A1 | 7/2019 | Lee et al. |
| 2020/0045491 A1* | 2/2020 | Robinson ............... H04R 5/033 |
| 2020/0077222 A1 | 3/2020 | Nguyen et al. |
| 2020/0104620 A1 | 4/2020 | Cohen et al. |
| 2020/0107149 A1 | 4/2020 | Sunder et al. |

FOREIGN PATENT DOCUMENTS

| | | |
|---|---|---|
| JP | 5285626 B2 | 9/2013 |
| JP | 2017092732 A | 5/2017 |
| WO | 2017116308 A1 | 7/2017 |
| WO | 2018110269 A1 | 6/2018 |
| WO | 2019059558 A1 | 3/2019 |

OTHER PUBLICATIONS

Mohapatra et al., "Generating Personalized End User Head-Related Transfer Function (HRTF) from Generic HRTF", related U.S. Appl. No. 16/662,995, Applicant's response to Non-Final Office Action filed May 5, 2020.

Politis et al., "Applications of 3D spherical transforms to personalization of head-related transfer functions", 2016 IEEE International Conference on Acoustics, Speech and Signal Processing (ICASSP), Mar. 2016.

"Hear an Entirely New Dimension of Sound", OSSIC, Retrieved from https://www.ossic.com/3d-audio/.

Dmitry N. Zotkin, Jane Hwang, Ramani Duraiswami, Larry S. Davis, "HRTF Personalization Using Anthropometric Measurements", Perceptual Interfaces and Reality Laboratory Institute for Advanced Computer Studies (UMIACS), University of Maryland (2003).

Henrik Moller, "Fundamentals of Binaural Technology", Acoustics Laboratory, Aalborg University, Mar. 3, 1992, Aalborg, Denmark.

James R. Milne, Gregory Carlsson, Tonni Sandager Larsen, "Global HRTF Repository", file history of related U.S. Appl. No. 16/424,313, filed May 28, 2019.

James R. Milne, Gregory Carlsson, Tonni Sandager Larsen, "Head Related Transfer Function (HRTF) as Biometric Authentication", file history of related U.S. Appl. No. 16/440,288, filed Jun. 13, 2019.

James R. Milne, Gregory Peter Carlsson, "Generating Personalized End User Head-Related Transfer Function (HRTF) Using Panoramic Images of Ear", file history of related U.S. Appl. No. 16/168,317, filed Oct. 23, 2018.

James R. Milne, Gregory Peter Carlsson, "Techniques Combining Plural Head-Related Transfer Function (HRTF) Spheres to Place Audio Objects", file history of related U.S. Appl. No. 16/424,983, filed May 29, 2019.

Milne et al., "Generating Personalized End User Head-Related Transfer Function (HRTF) from Generic HRTF", file history of related U.S. Appl. No. 16/662,995, filed Oct. 24, 2019.

Slim Ghorbal, Renaud Seguier, Xavier Bonjour, "Process of HRTF Individualization by 3D Statistical Ear", Audio Engineering Society, Convention e-Brief 283, Presented at the 141st Convention, Sep. 29-Oct. 2, 2016, Los Angeles, CA.

Sridhar et al., "A Database of Head-Related Transfer Function and Morphological Measurements", Audio Engineering Society, Oct. 2017, New York.

Sylvia Sima, "HRTF Measurements and Filter Designs for a Headphone-Based 3D-Audio System", Faculty of Engineering and Computer Science, Department of Computer Science, University of Applied Sciences, Hamburg, Germany, Sep. 6, 2008.

Thibaut Carpentier, "Binaural synthesis with the Web Audio api". 1st Web Audio Conference (WAC), Jan. 2015, Paris France, p. 1-p. 9.

Yarra 3DX: The most advanced 3D audio system in the world, Jul. 2016, retrieved from https://www.kickstarter.com/projects/yarra3dx/yarra-3dx-the-most-advanced-3d-audio-system-in-the#:~:text=THE%20WORLD'S%20MOST%20ADVANCED%203D,theaters%20and%203D%20audio%20headphones.

James R. Milne, Gregory Carlsson, Tonni Sandager Larsen, "Global HRTF Repository", related U.S. Appl. No. 16/424,313, Non-Final Office Action dated Aug. 6, 2020.

(56) References Cited

OTHER PUBLICATIONS

James R. Milne, Gregory Carlsson, Tonni Sandager Larsen, "Global HRTF Repository", related U.S. Appl. No. 16/424,313, Applicant's response to Non-Final Office Action filed Sep. 17, 2020.

James R. Milne, Gregory Peter Carlsson, "Generating Personalized End User Head-Related Transfer Function (HRTF) Using Panoramic Images of Ear", related U.S. Appl. No. 16/168,317, Non-Final Office Action dated Aug. 4, 2020.

James R. Milne, Gregory Peter Carlsson, "Generating Personalized End User Head-Related Transfer Function (HRTF) Using Panoramic Images of Ear", related U.S. Appl. No. 16/168,317, Applicant's response to Non-Final Office Action Sep. 17, 2020.

Milne et al., "Techniques Combining Plural Head-Related Transfer Function (HRTF) Spheres to Place Audio Objects", related U.S. Appl. No. 16/424,983, Final Office Action dated Sep. 18, 2020.

Mohapatra et al., "Generating Personalized End User Head-Related Transfer Function (HRTF) from Generic HRTF", related U.S. Appl. No. 16/662,995, Non-Final Office Action dated Jul. 31, 2020.

Mohapatra et al., "Generating Personalized End User Head-Related Transfer Function (HRTF) from Generic HRTF", related U.S. Appl. No. 16/662,995, Applicant's response to Non-Final Office Action filed Sep. 15, 2020.

Farina et al., "Measuring Spatial MIMO Impulse Responses in Rooms Employing Spherical Transducer Array", AES, 2016.

Milne et al., "Techniques Combining Plural Head-Related Transfer Function (HRTF) Spheres to Place Audio Objects", related U.S. Appl. No. 16/424,983, Non-Final Office Action dated May 15, 2020.

Milne et al., "Techniques Combining Plural Head-Related Transfer Function (HRTF) Spheres to Place Audio Objects", related U.S. Appl. No. 16/424,983, Applicant's response to Non-Final Office Action filed May 27, 2020.

James R. Milne, Gregory Carlsson, Tonni Sandager Larsen, "Global HRTF Repository", related U.S. Appl. No. 16/424,313, Final Office Action dated Dec. 17, 2020.

James R. Milne, Gregory Carlsson, Tonni Sandager Larsen, "Global HRTF Repository", related U.S. Appl. No. 16/424,313, Applicant's response to Final Office Action filed Dec. 28, 2020.

Thesaurus, Deviation Synonyms, Deviation Antonyms, (Year:2011).

Mohapatra et al., "Generating Personalized End User Head-Related Transfer Function (HRTF) from Generic HRTF", related U.S. Appl. No. 16/662,995, Applicant's response to Final Office Action filed Oct. 27, 2020.

Mohapatra et al., "Generating Personalized End User Head-Related Transfer Function (HRTF) from Generic HRTF", related U.S. Appl. No. 16/662,995, Final Office Action dated Sep. 29, 2020.

Milne et al., "Techniques Combining Plural Head-Related Transfer Function (HRTF) Spheres to Place Audio Objects", related U.S. Appl. No. 16/424,983, Applicant's response to Final Office Action filed Nov. 10, 2020.

Mohapatra et al., "Generating Personalized End User Head-Related Transfer Function (HRTF) from Generic HRTF", related U.S. Appl. No. 16/662,995, Non-Final Office Action dated Jan. 21, 2021.

Mohapatra et al., "Generating Personalized End User Head-Related Transfer Function (HRTF) from Generic HRTF", related U.S. Appl. No. 16/662,995, Applicant's response to Non-Final Office Action filed Feb. 1, 2021.

\* cited by examiner

GENERATING PERSONALIZED END USER ROOM-RELATED TRANSFER FUNCTION (RRTF)

FIELD

The present application relates generally to generating personalized end user room-related transfer functions (RRTF).

BACKGROUND

Binaural or head-related transfer function (HRTF) calibration currently requires expensive equipment made by specialized manufacturers. This method of calibration requires a microphone to be inserted into each ear and frequency sweeps played from individual speakers surrounding the listening position. Alternatively, pictures of the face and each ear of an individual can be taken to create a personalized HRTF model/file. This method suffers from inaccuracy in producing good HRTFs.

Furthermore, it can be advantageous to generate a room-related transfer function (RRTF) for a specific speaker setup.

SUMMARY

Accordingly, a system includes at least one computer medium that is not a transitory signal and that in turn includes instructions executable by at least one processor to receive indication of a desired origin of sound played on a sound bar. The instructions are executable to identify a virtual location from whence the sound is emulated to originate, and based on the desired origin and the virtual location, alter a first room related transfer function (RRTF) to establish a personalized RRTF.

In example implementations, the instructions may be executable to alter the first RRTF based on a difference between the desired origin and the virtual location. The indication of the desired location may be received from a touch sensitive display. The computer medium and processor may be implemented in, e.g., a tablet computer or a wireless telephone.

In non-limiting examples, the instructions are executable to present on a display at least one user interface (UI) configured to allow selection of the first RRTF from among plural RRTFs. The plural RRTFs can be associated with respective speaker setups.

In another aspect, a method includes identifying a first room related transfer function (RRTF), identifying an emulated origination of sound played on at least a first speaker, identifying a desired origination of the sound, and based at least in part on a difference between the emulated origination and desired origination, modifying the first RRTF.

In another aspect, a consumer electronics (CE) device includes at least one touch sensitive display, at least one processor configured for controlling the display, and at least one computer storage bearing instructions executable by the processor to receive user selection of a first head related transfer function (RRTF). The instructions are executable to receive at least one user indication of a desired origination of sound, and based at least in part on the user indication, alter the first RRTF to render a personalized RRTF. The instructions may be executable to generate audio using the personalized RRTF.

The details of the present application, both as to its structure and operation, can be best understood in reference to the accompanying drawings, in which like reference numerals refer to like parts, and in which:

DETAILED DESCRIPTION

Figure 1:
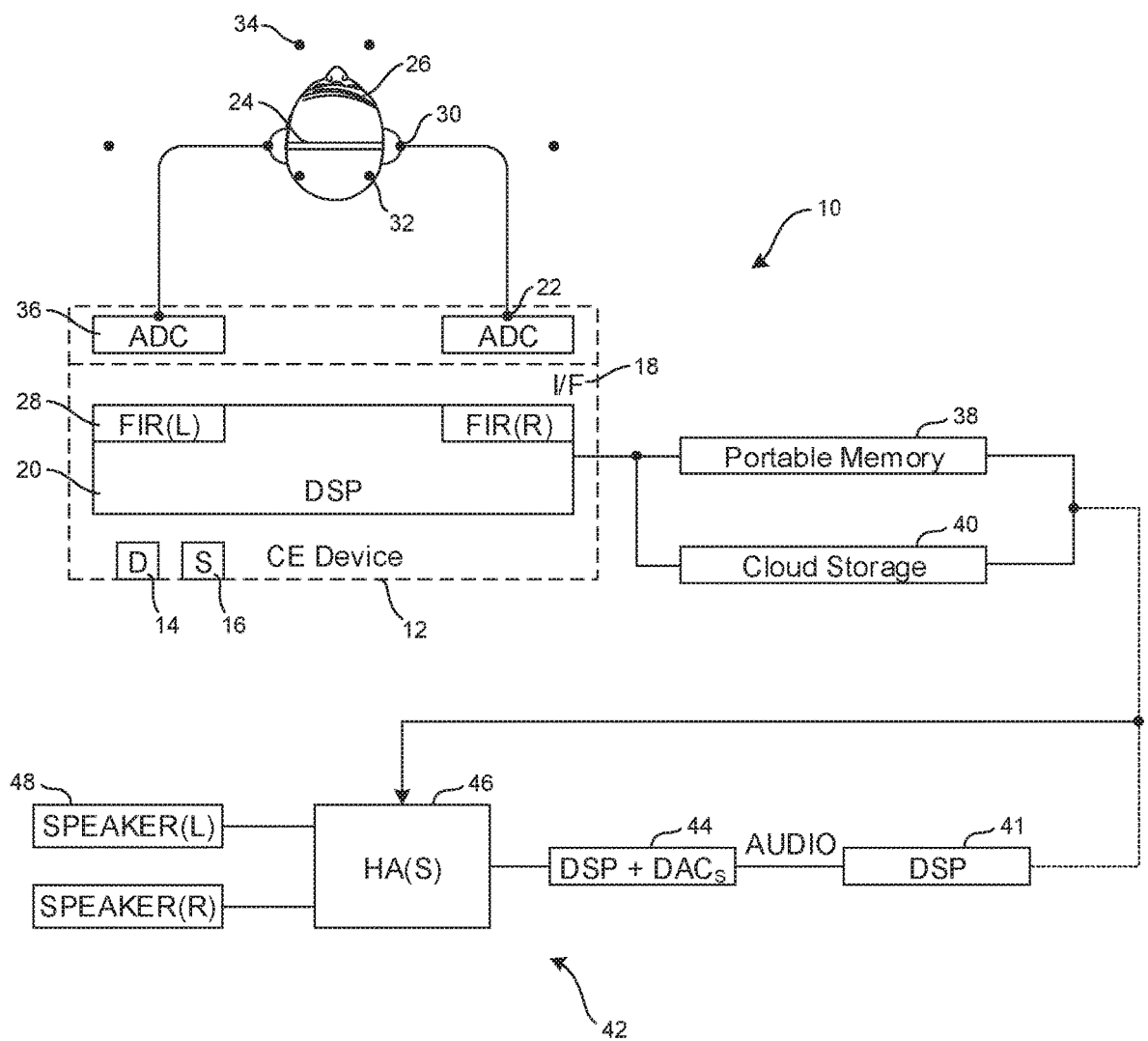
FIG. 1 is a block diagram of an example HRTF recording and playback system.

U.S. Pat. No. 9,854,362 is incorporated herein by reference and describes details of finite impulse response (FIR) filters mentioned below. U.S. Pat. No. 10,003,905, incorporated herein by reference, describes techniques for generating head related transfer functions (HRTF) using microphones.

This disclosure accordingly relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is an example of a device that may be configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, and one or more speakers 16 for outputting audio in accordance with present principles. The example CE device 12 may also include one or more network interfaces 18 for communication over at least one network such as the Internet, a WAN, a LAN, etc. under control of one or more processors 20 such as but not limited to a DSP. It is to be understood that the processor 20 controls the CE device 12 to undertake present principles, including the other elements of the CE device 12 described herein. Furthermore, note the network interface 18 may be, e.g., a wired or wireless modem or router, or other appropriate interface such as, e.g., a wireless telephony transceiver, Wi-Fi transceiver, etc.

In addition, to the foregoing, the CE device 12 may also include one or more input ports 22 such as, e.g., a USB port to physically connect (e.g. using a wired connection) to another CE device and/or a headphone 24 that can be worn by a person 26. The CE device 12 may further include one or more computer memories 28 such as disk-based or solid-state storage that are not transitory signals on which is stored files such as the below-mentioned HRTF calibration files. The CE device 12 may receive, via the ports 22 or wireless links via the interface 18 signals from first microphones 30 in the earpiece of the headphones 24, second microphones 32 in the ears of the person 26, and third microphones 34 external to the headphones and person, although only the headphone microphones may be provided in some embodiments. The signals from the microphones 30, 32, 34 may be digitized by one or more analog to digital converters (ADC) 36, which may be implemented by the CE device 12 as shown or externally to the CE device.

As described herein, the signals from the microphones can be used to generate HRTF calibration files that are personalized to the person 26 wearing the calibration headphones. A HRTF calibration file typically includes at least one and more typically left ear and right ear FIR filters, each of which typically includes multiple taps, with each tap being associated with a respective coefficient. By convoluting an audio stream with a FIR filter, a modified audio stream is produced which is perceived by a listener to come not from, e.g., headphone speakers adjacent the ears of the listener but rather from relatively afar, as sound would come from an orchestra for example on a stage that the listener is in front of.

To enable end users to access their personalized HRTF files, the files, once generated, may be stored on a portable memory 38 and/or cloud storage 40 (typically separate devices from the CE device 12 in communication therewith, as indicated by the dashed line), with the person 26 being given the portable memory 38 or access to the cloud storage 40 so as to be able to load (as indicated by the dashed line) his personalized HRTF into a receiver such as a digital signal processor (DSP) 41 of playback device 42 of the end user. A playback device may include one or more additional processors such as a second digital signal processor (DSP) with digital to analog converters (DACs) 44 that digitize audio streams such as stereo audio or multi-channel (greater than two track) audio, convoluting the audio with the HRTF information on the memory 38 or downloaded from cloud storage. This may occur in one or more headphone amplifiers 46 which output audio to at least two speakers 48, which may be speakers of the headphones 24 that were used to generate the HRTF files from the test tones. U.S. Pat. No. 8,503,682, owned by the present assignee and incorporated herein by reference, describes a method for convoluting HRTF onto audio signals. Note that the second DSP can implement the FIR filters that are originally established by the DSP 20 of the CE device 12, which may be the same DSP used for playback or a different DSP as shown in the example of FIG. 1. Note further that the playback device 42 may or may not be a CE device.

In some implementations, HRTF files may be generated by applying a finite element method (FEM), finite difference method (FDM), finite volume method, and/or another numerical method, using 3D models to set boundary conditions.

Figure 2:
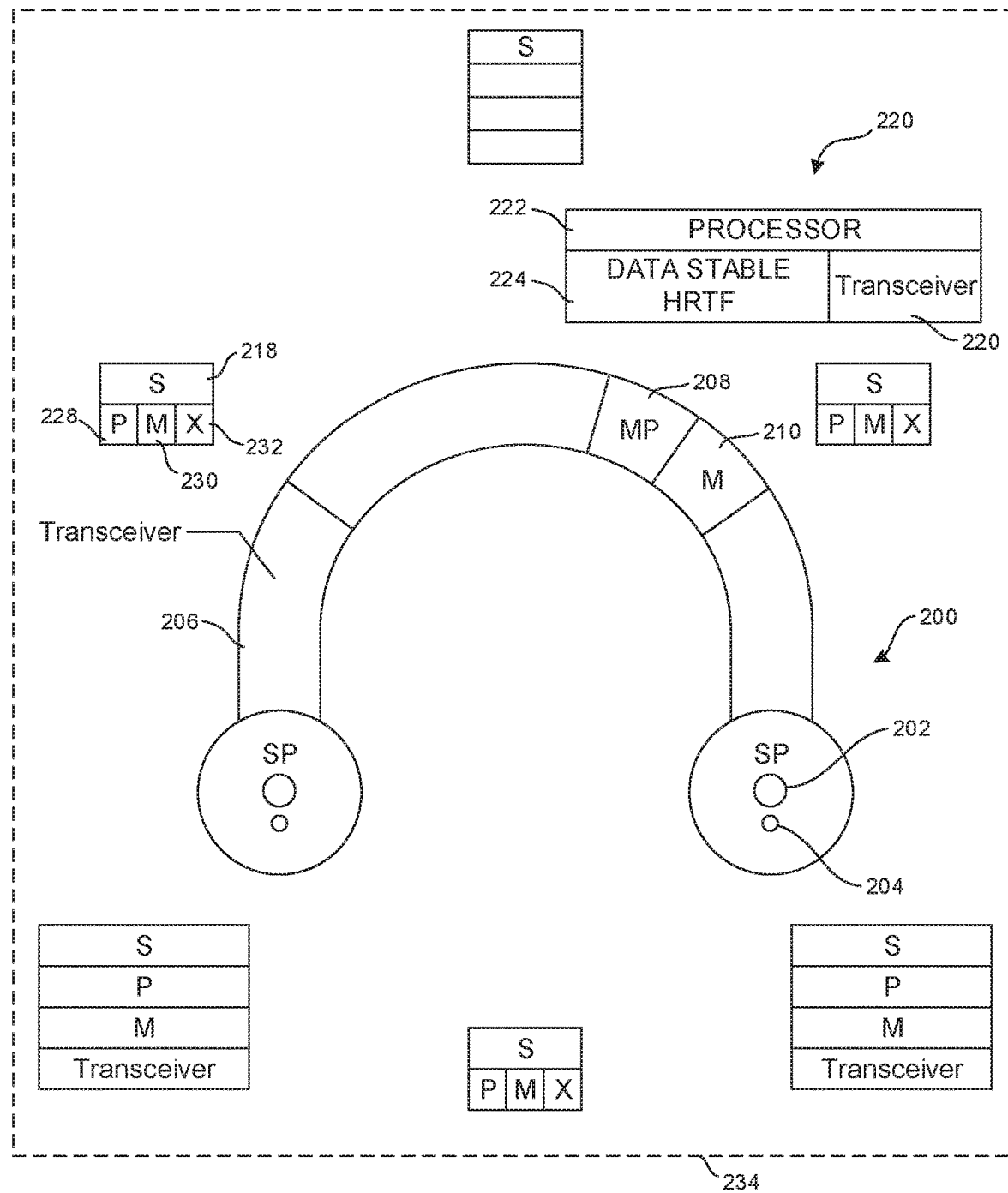
FIGS. 2 and 3 are block diagrams of example HRTF recording systems.
Figure 3:
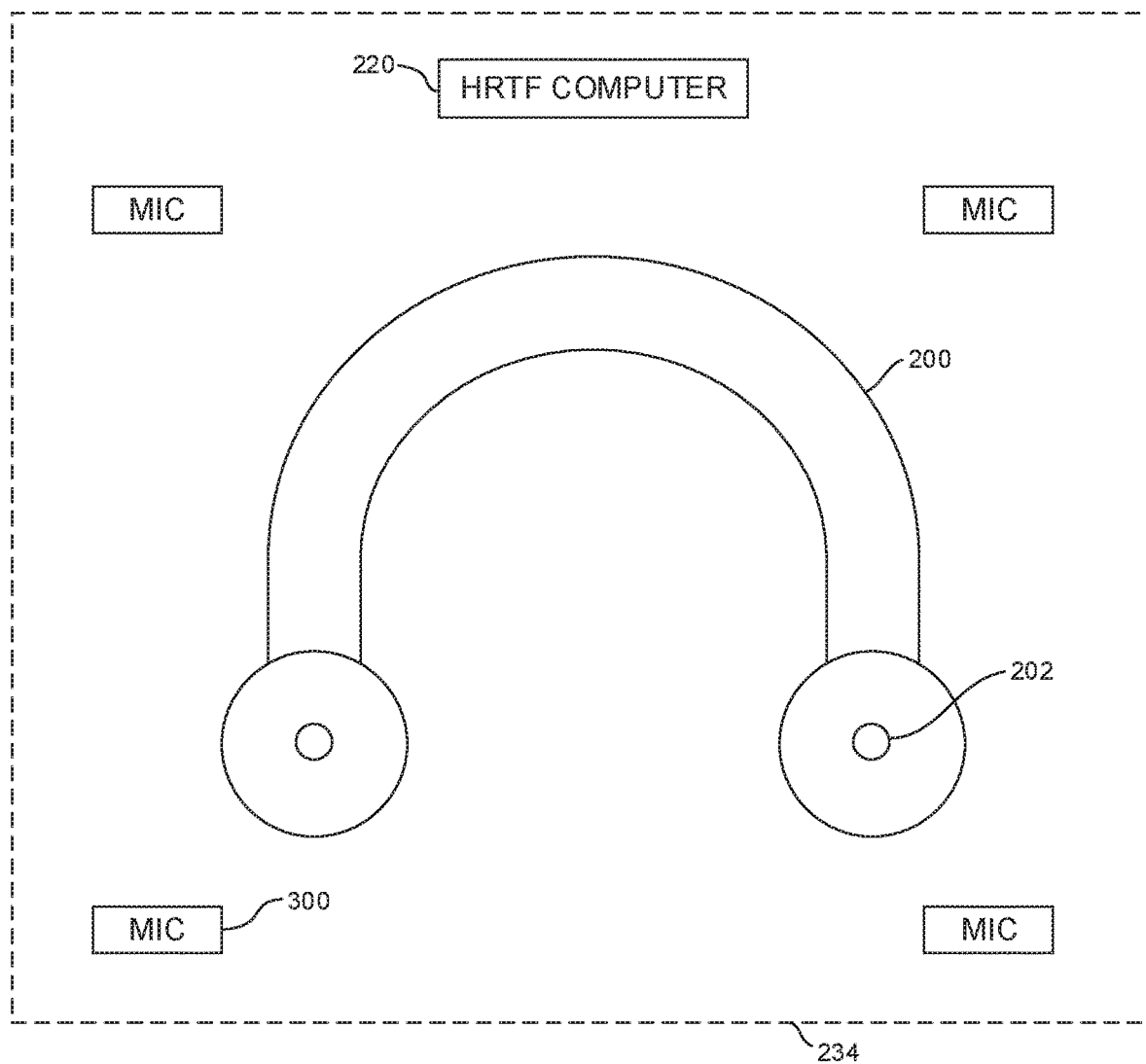

FIGS. 2 and 3 show respective HRTF file generation systems. In FIG. 2, a person (not shown) may wear headphones 200 with left and right earphone speakers 202. In lieu of or adjacent to each speaker 202 may be a respective microphone 204 for playing HRTF calibration test tones.

In the example shown, the headphones 200 may include one or more wireless transceivers 206 communicating with one or more processors 208 accessing one or more computer storage media 210.

In the example of FIG. 2, test tones from one or more speakers 218 may be played and picked up by the microphones 204, and signals from the microphones 204 may be sent via the transceiver 206 or through a wired connection to a HRTF generation computer 220, which typically includes a processor 222, computer storage 224, and communication interface 226, as well as other appropriate computers such as any described herein. Also, each speaker 218 may include a speaker processor 228 accessing speaker computer storage 230 and communicating via wired or wireless links with the computer 220 via a communication interface 232. In the example shown, test tones or other test sounds are generated by plural speakers surrounding the headphones 200 within a space 234. The space 234 may be a room of the end user's dwelling, with HRTF files being generated for each room and then the HRTF file corresponding to a room in which the end user wishes to listen to audio being selected. Or, the space 234 may be an anechoic-coated or other special sound recording room. Yet again, to generate a venue specific HRTF that is independent of a person and later concatenated with a person's HRTF, the space 234 may be the venue itself, e.g., Carnegie Hall, Sadler's Wells, Old Vic, the Bolshoi theater, etc. U.S. Pat. No. 8,787,584, owned by the present assignee and incorporated herein by reference, describes a method for establishing HRTF files to account for the size of a human head. U.S. Pat. No. 8,520,857, owned by the present assignee and incorporated herein by reference, describes a method for determining HRTF. This patent also describes measuring a HRTF of a space with no dummy head or human head being accounted for.

FIG. 3 illustrates an embodiment that in all essential respects is identical to that of FIG. 2, except that instead of test audio being played on external speakers and picked up on microphones in the headphones 200, test audio is played on the speakers 202 of the headphones 200 and picked up by one or more microphones 300 that are external to the headphones 200 and in communication with the HRTF computer 220.

Figure 4:
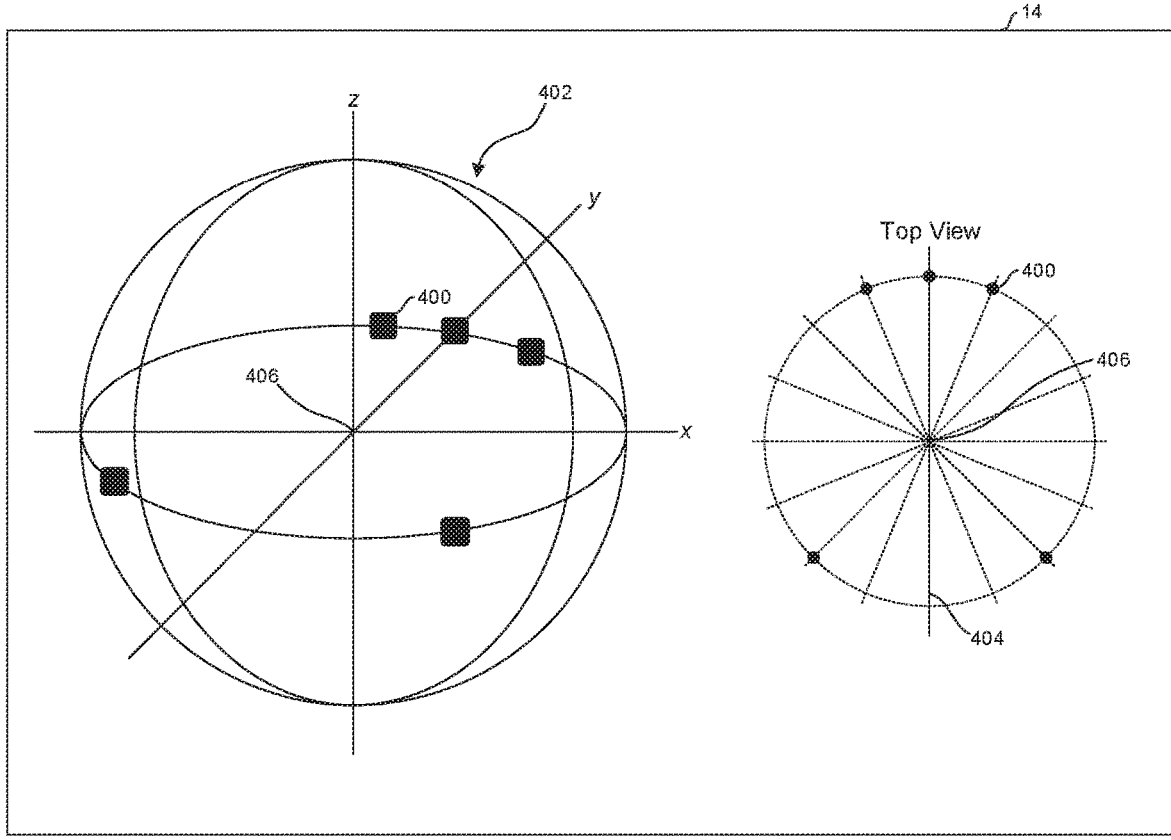
FIG. 4 is a schematic diagram showing a 3D and 2D overhead view of an example speaker arrangement.

FIG. 4 illustrates a model speaker layout that may be presented as a user interface (UI) on, for example, the display 14 of the CE device 12. The depicted layout shows a 3D view of locations 400 of modeled speakers arranged on or in a sphere 402. It is to be understood that while FIG. 4 illustrates a 5.1 speaker setup, present principles apply to other speaker setups, e.g., 5.1.4 (with speakers at different heights as well as different azimuths), 13.1, etc.

The UI in FIG. 4 may also contain a "slice" view 404 of the sphere 402. In the example shown, the slice view 404 is a top view that shows all five speakers in the same horizontal plane arranged at respective azimuths from the center 406 of the sphere 402. In addition or alternatively, an elevation view of the speakers may be shown for, e.g., a 5.1.4 layout.

Figure 5:
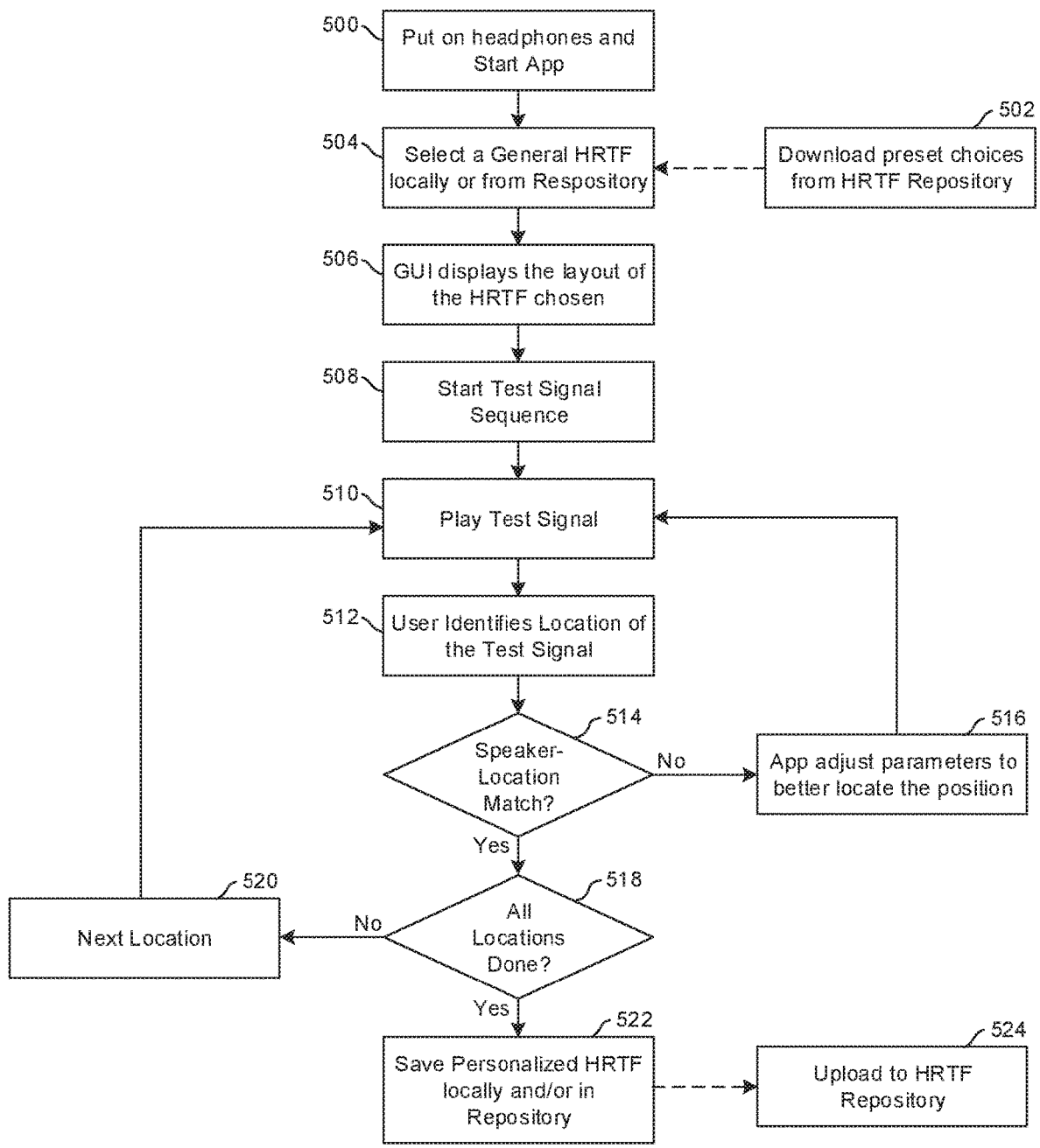
FIG. 5 is a flow chart of example logic consistent with present principles.

FIG. 5 illustrates logic consistent with present principles to derive a personalized HRTF for a person using either of the example physical setups in FIGS. 2 and 3 from a generic HRTF. In a non-limiting example, the machine-executed steps of the logic may be implemented as a computer application ("app") executed by the processor of the CE device 12.

Commencing at block 500, the person (also referred to herein as "user") dons any of the headphones described herein and the logic is invoked, e.g., by starting the application. Block 502 indicates that one or more generic HRTFs (e.g., a first HRTF for a 5.1 setup, a second HRTF for a 13.1 setup, or other generic HRTFs) are downloaded from, e.g., an Internet server, and at block 504 input is received from the user manipulating, e.g., the touch-sensitive display 14 or other input device selecting one of the generic HRTFs.

Proceeding to block 506, one or more of the UI of FIG. 4 or the UIs described further below are presented on, e.g., the display 14 of the CE device 12 showing the speaker setup associated with the HRTF selected at block 504. Moving from block 506 to block 508, a test signal sequence is commenced in which the logic moves to block 510 to play on the headphones test signal such as a tone or frequency sweep emulated to be from one of the virtual speaker locations in the speaker setup.

Proceeding to block 512, input is received from, e.g., a touch by the user on the display 14 indicating a location in the virtual space illustrated in the UI from whence the user perceives the test tone to originate. The logic determines at decision diamond 514 whether the perceived location received at block 512 matches the location of the virtual speaker from whence the test tone was emulated to originate.

If the locations do not match, the logic moves from decision diamond 514 to block 516 to adjust parameters (e.g., amplitude, phase, and frequency response) of the generic HRTF for the particular frequency of the test tone. In one non-limiting example, an acoustic model such as the model known as "WAON" from Cybernet of Japan may be used for the adjustment. The logic then loops back to block 510 to replay the test signal.

As indicated in FIG. 5, the above process may be repeated until a positive test is returned at decision diamond 514 (perceived location and emulated location of sound origination match), in which case the logic proceeds to decision diamond 518. At decision diamond 518 it is determined whether all emulated speaker locations (and if desired all emulated frequencies from each speaker location) have been tested. If not, the next speaker location (and/or next test frequency) is retrieved at block 520 and the logic loops back to block 510 to play the next frequency from an emulated origination location of the next speaker retrieved at block 520.

On the other hand, once it is determined that the testing is complete, i.e., that the HRTF parameters have been adjusted such that perceived locations match all emulated speaker locations of test tone origination, the logic saves the adjusted HRTF, now modified from the generic HRTF in a way that is personalized to the user, at block 522. The adjusted ("personalized") HRTF for the user may be saved locally and/or on an Internet server, from whence it may be provided at block 524 to an HRTF repository that can be accessed via the Internet by the user or by providers of music or other audio such as a service that the user might subscribe to. The service might bill the user extra for providing audio using the user's personalized HRTF.

In this way, personal HRTF calibration is provided to the prosumer or consumer without the use a lot of special equipment or technical knowledge. The personalized HRTF can be modified as often as the user desires. The user can create multiple personalized HRTF models/files and save them.

Once the personalized HRTF is saved, the user can recall the HRTF on a given platform or device and listen to music with that selected HRTF.

The methodology described above is for headphone applications. It is to be understood that present techniques may be used for sound bars, portable speakers, or other audio systems.

Figure 6:
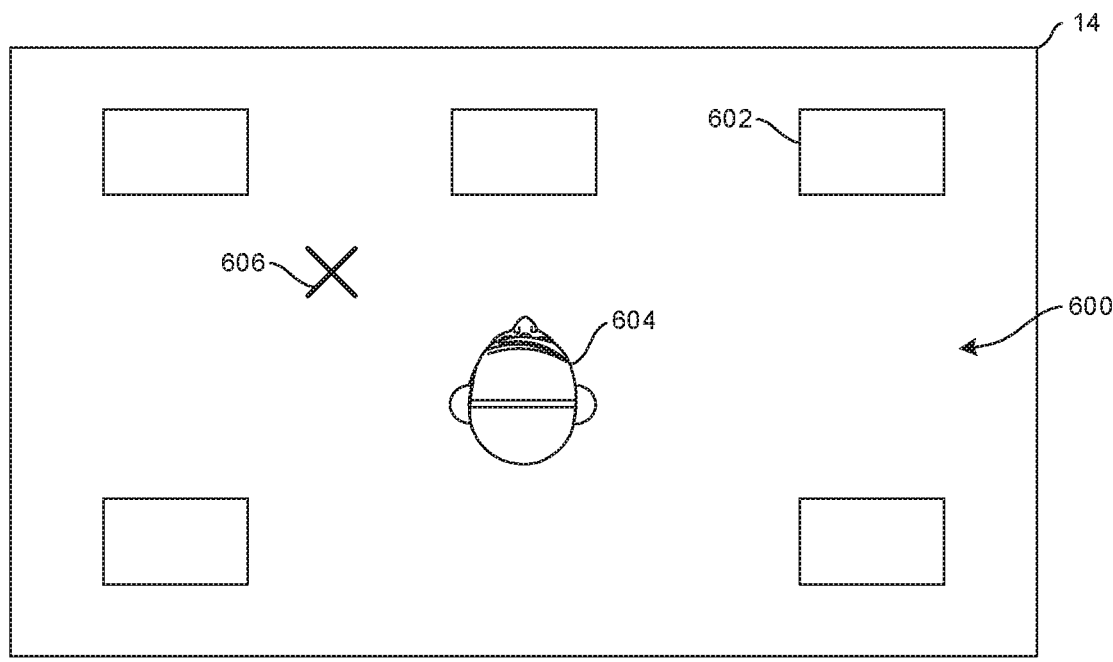
FIGS. 6-8 are example user interfaces consistent with present principles.
Figure 7:
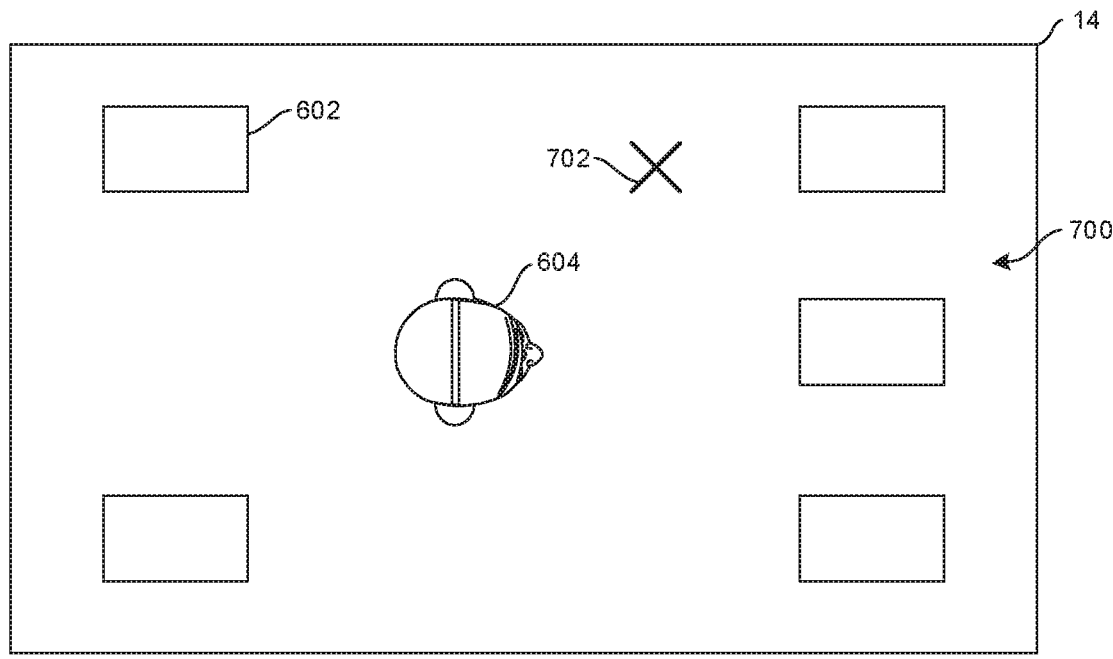
Figure 8:
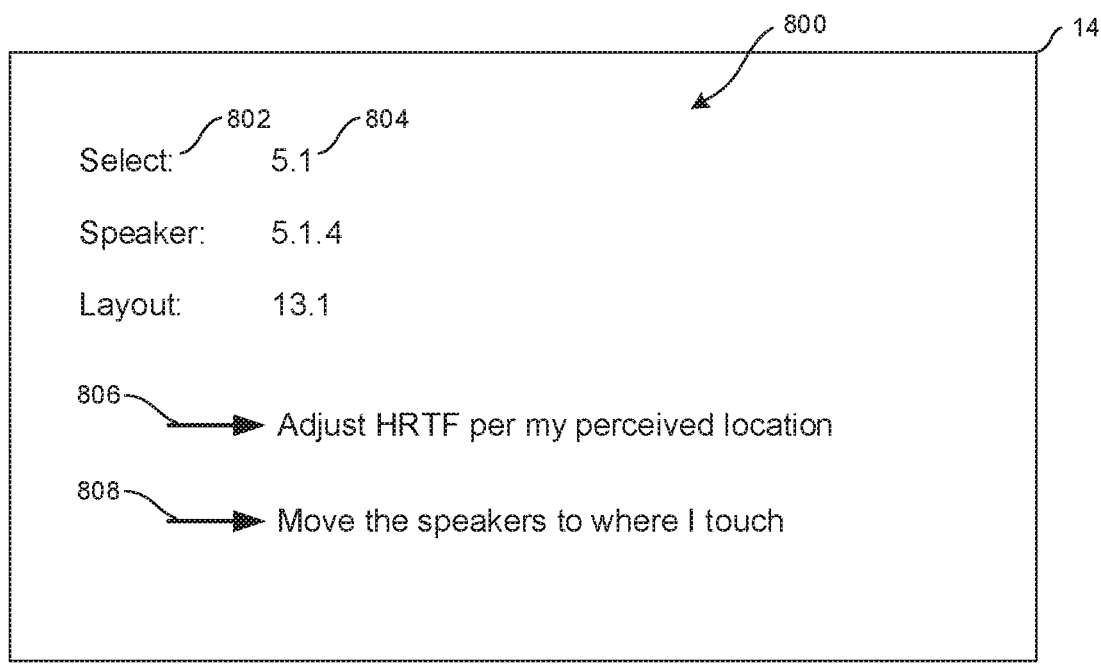

FIGS. 6-8 illustrate example UIs consistent with the description above. FIG. 6 shows a UI 600 that is a top plan view of virtual speaker locations 602 while FIG. 7 shows a UI 700 that is a side elevation view of the virtual speaker locations 602. The location 604 of the user also is shown. The number of speakers in the UIs 600, 700 is for example only.

As shown in FIG. 6, the user has indicated at 606 (by, e.g., touching the display 14) a perceived location of test tone origination. FIG. 7 illustrates at 702 a similar indication of perceived test tone origination. Note that the perceived locations 606, 702 do not match any of the emulated locations of the depicted virtual speakers.

FIG. 8 illustrates a further UI 800. A prompt 802 may be presented for the user to select from a list 804 a desired speaker setup (and, hence, a generic HRTF). A first selector 806 may be presented consistent with principles described above in FIG. 5 and selectable to adjust the generic HRTF to "move" the perceived test tone origination location to the emulated location of one of the virtual speakers (e.g., the emulated speaker location nearest the perceived location). If desired, however, a second selector 808 may be presented and selectable to cause the emulated locations of speakers to be moved to locations defined by where the user touches the display.

Figure 9:
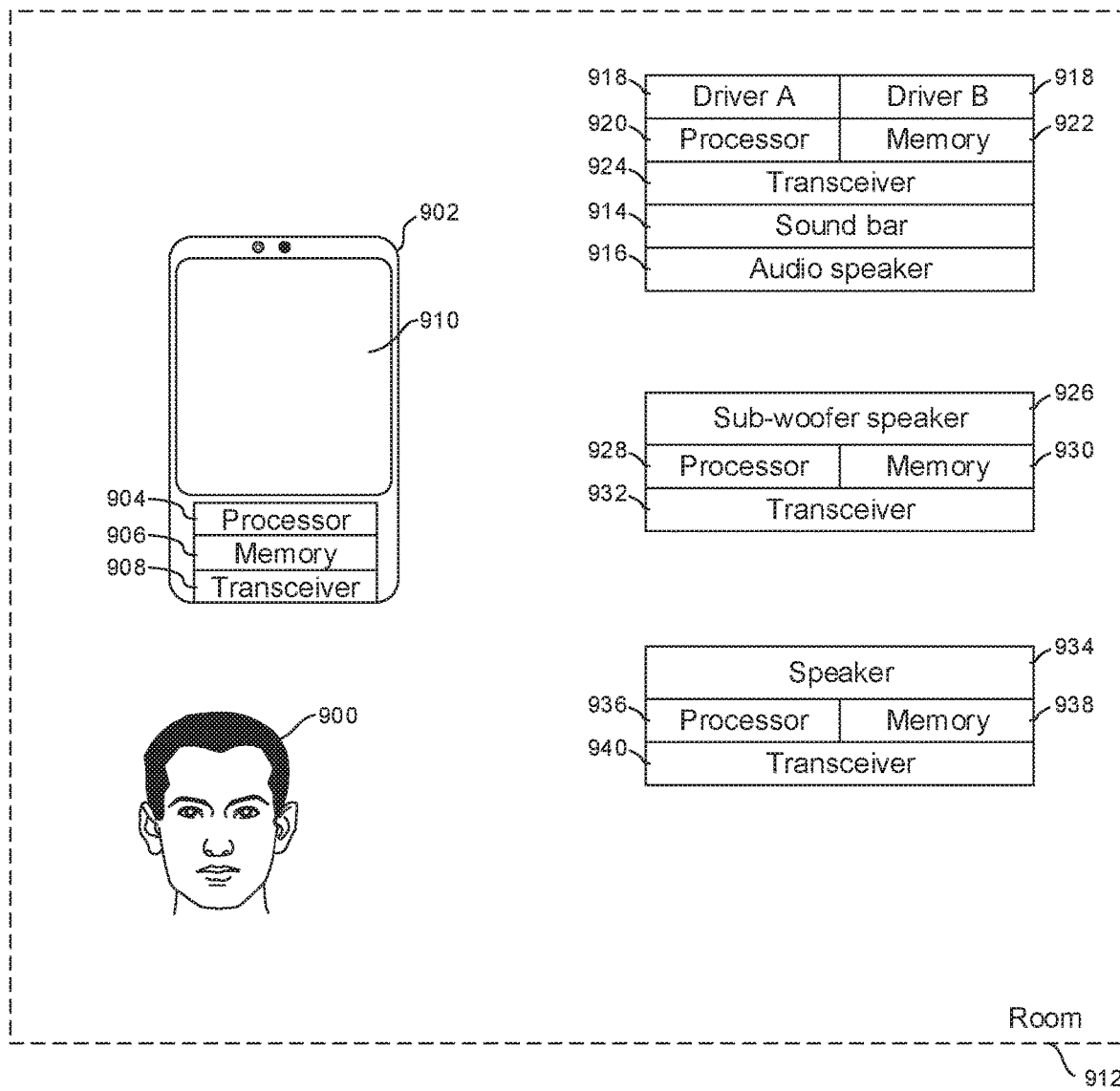
FIG. 9 is a block diagram of a test setup for generating a RRTF for a specified speaker setup.

Now referring to FIG. 9, an arrangement is shown for generating a personalized room-related transfer function (RRTF). A user 900 who need not wear headphones as shown may manipulated a user device 902 such as but not limited to a wireless phone or tablet computer to execute, using a processor 904, an application ("app") stored on a computer medium 906 to undertake principles herein. The device 902 may include a wireless transceiver 908 and a touch sensitive display 910.

In the non-limiting example shown, the device 902 is in a room 912 along with multiple speakers including a sound bar 914 that includes one or more audio speakers (i.e., sound transducers) 916 for producing audio from signals output by one or more drivers 918 (two drivers shown in the example of FIG. 9). In some embodiments the sound bar 914 may include one or more processors 920 accessing one or more computer media 922 and communicating with other devices described herein using one or more wireless transceivers 924.

The non-limiting speaker arrangement shown in FIG. 9 also includes a sub-woofer 926 with processor 928, computer medium 930, and transceiver 932. One or more other speakers 934 also may be included with processor 936, computer medium 938, and transceiver 940. Like the sound bar 914, each speaker shown in FIG. 9 may have multiple drivers.

In addition to the example shown, other speaker layouts in the room 912 may include a sound bar only; a sound bar plus a subwoofer; a sound bar plus rear speakers plus elevated speakers (in a plane above that of the sound bar), etc.

Figure 10:
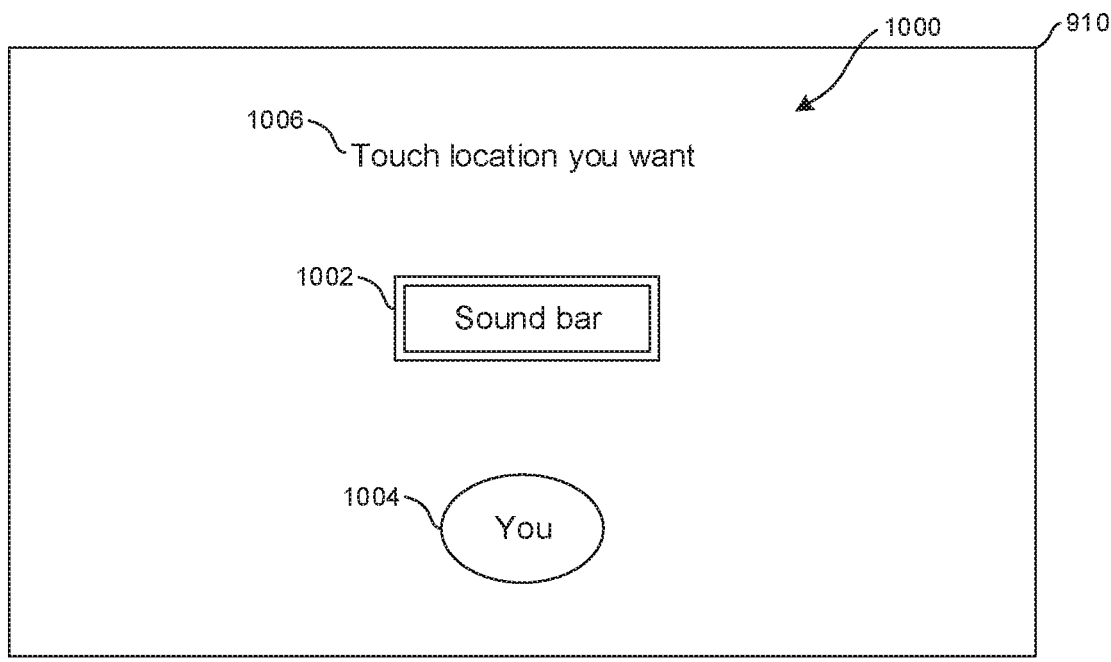
FIGS. 10 and 11 are UIs related to FIG. 9.

FIG. 10 illustrates a UI 1000 that may be presented on the display 910 of the user device 902 shown in FIG. 9. As shown, the UI depicts a speaker icon 1002 representing, for example, the sound bar 914 along with a user icon 1004 representing the user 900. The icons 1002, 1004 may be arranged on the display 910 in the same relative orientation with respect to each other (looking down on the display) as the sound bar 914 and user 900 physically are in with respect to each other in the room 912.

To this end, presence detection of both the sound bar 914 and user 900 can be used to generate the UI 1000. For example, a location sensor in the sound bar 914 such as a global positioning satellite (GPS) receiver may be used to communicate the geographic location of the sound bar 914 over the wireless transceiver 924. Or, a near field communication (NFC) device may be provided on the sound bar to communicate with an NFC reader in the room 912. Similarly, the location of the user 900 may be assumed to be the location of the user device 902 as indicated by a GPS receiver in the user device. Yet again, a camera may image the room 912 including the user 900 and sound bar 914 and image recognition executed on the image to identify the objects (and hence their positions) in the room. The physical locations of objects in the room 912 (and concomitant orientations relative to each other) may then be emulated in the UI 1000.

Figure 11:
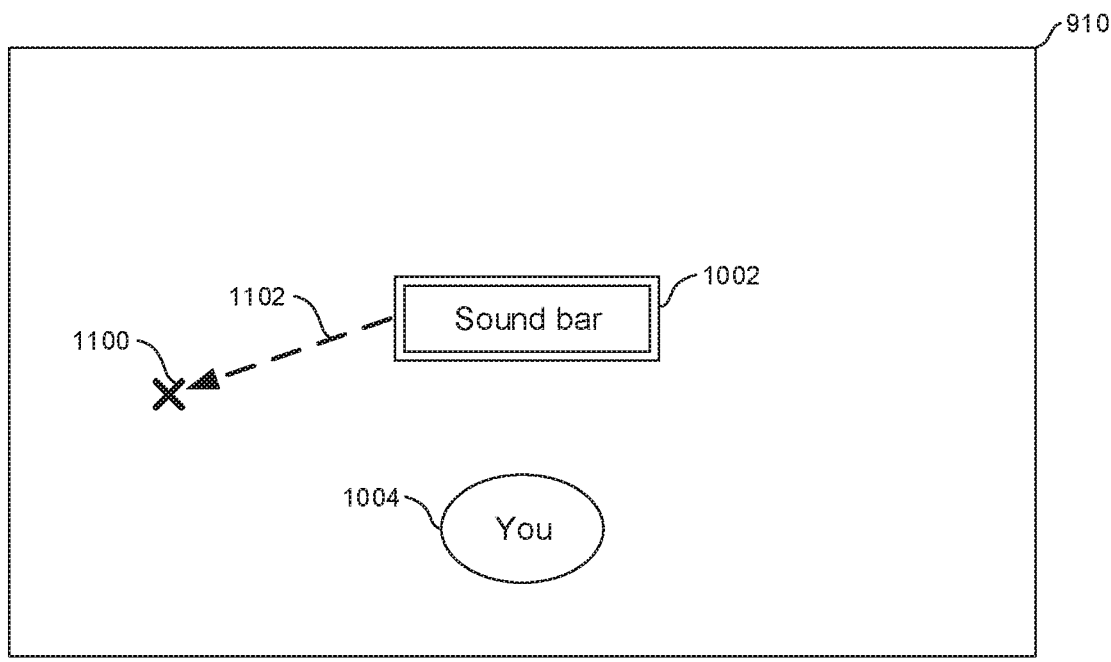

As set forth further below, test sounds are emitted from the sound bar 914 and in the example shown, the UI 1000 may include a prompt 1006 for the user to touch the display 910 at a location at which the user wishes the sound bar to be emulated to be located. The user may touch the display 910 at a location 1100 shown in FIG. 11 to cause the sound bar 914 to be altered to emulate it moving as indicated by the arrow 1102 to the new location 1100 according to techniques described above and further described below.

Figure 12:
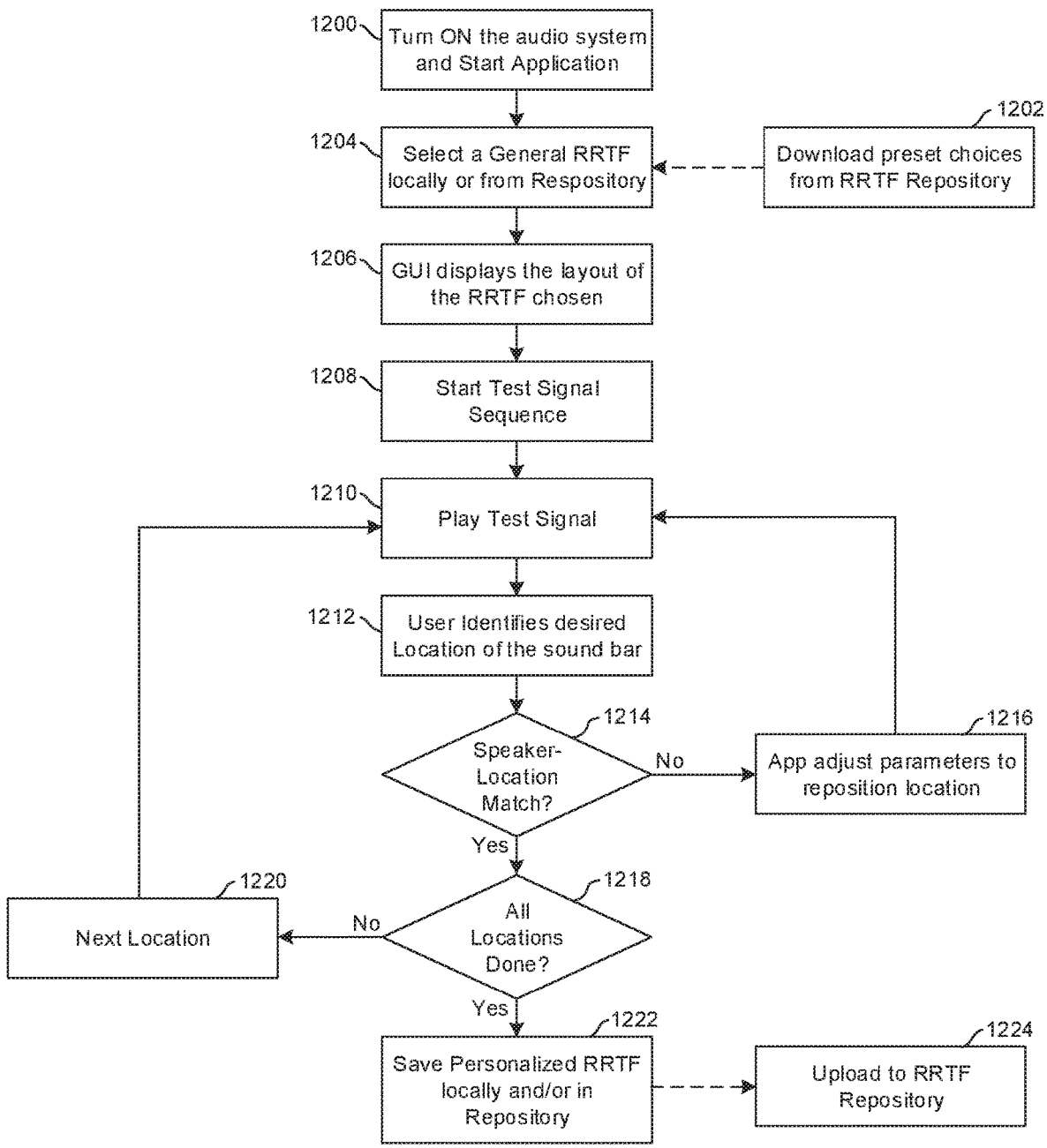
FIG. 12 is a flow chart of example RRTF logic consistent with FIG. 9.

With the above in mind and summarizing the logic reflected in FIG. 12 prior to describing it in detail, the user selects a general RRTF model based on the specific sound bar/speaker setup in the room 912. Various general RRTF's are available as presets. The presets can be downloaded locally or from the cloud. Presence detection of the speakers can be used to select a RRTF preset according to the example techniques described previously.

A test signal is played from a specific driver of the sound bar. The user listens and identifies the location from whence the sound originates. The user identifies or verifies the location he heard relative to the test signal by touching the position on the app GUI. The position is relative to the listening position. For example, the user can indicate that he wants the left channel to sound farther to the left in the room setup. If the driver location signal and desired location are not the same, the app will adjust driver parameters (e.g., amplitude, phase, L-R, R-L, and frequency response) and replay the test signal. The process is repeated until the driver signal and the desired location are at an expected location. The next driver location test signal is played, and the process repeated until all driver test signals are properly located, at which point the results are saved locally and/or in the cloud. In this way, the use of special equipment or technical knowledge is not required. The RRTF experience can be modified as often as the customer desires. The customer can create multiple RRTF experiences for multiple speaker setups and save them. Once the RRTF is saved, the user can recall the HRTF on a given platform or device and listen to music with that selected RRTF. RRTFs can be created for a single listening spot or a wider listening spot.

Now referring specifically to FIG. 12, commencing at block 1200, the person (also referred to herein as "user") energizes the speakers in the room 912 and starts the application executing the logic herein on the user device 902. The person need not don headphones. Block 1202 indicates that one or more generic RRTFs (e.g., a first RRTF for a 5.1 setup, a second RRTF for a 13.1 setup, or other generic RRTFs) are downloaded from, e.g., an Internet server, and at block 1204 input is received from the user manipulating, e.g., the touch-sensitive display 910 or other input device selecting one of the generic RRTFs. A list of RRTFs similar to the list of HRTFs shown in FIG. 8 may be used for this step.

Proceeding to block 1206, the UI 1000 of FIG. 10 may be presented on the display 910 showing the speaker setup associated with the RRTF selected at block 1204. Moving from block 1206 to block 1208, a test signal sequence is commenced in which the logic moves to block 1210 to play on the sound bar 914 for example a tone or frequency sweep emulated to be from the appropriate one of the virtual speaker locations in the speaker setup. The test tone may be generated using only one of multiple drivers of the speaker (e.g., the sound bar) and test tones may be generated successively using successive ones of multiple drivers.

Proceeding to block 1212, input is received from, e.g., a touch by the user on the display 910 in FIG. 9 indicating a location in the virtual space illustrated in the UI from whence the user desires the test tone to originate. The logic determines at decision diamond 1214 whether the desired location received at block 1212 matches the location of the virtual speaker from whence the test tone was emulated to originate.

If the locations do not match, the logic moves from decision diamond 1214 to block 1216 to adjust parameters (e.g., amplitude, phase, frequency response, shifting left channel to right channel or right channel to left channel) of the generic RRTF for the particular frequency of the test tone. The logic then loops back to block 1210 to replay the test signal.

As indicated in FIG. 12, the above process may be repeated until a positive test is returned at decision diamond 1214 (desired location and emulated location of sound origination match), in which case the logic proceeds to decision diamond 1218. At decision diamond 1218 it is determined whether all emulated speaker locations and/or drivers (and if desired all emulated frequencies from each speaker location) have been tested. If not, the next speaker location (and/or next test frequency and/or next driver) is retrieved at block 1220 and the logic loops back to block 1210 to play the next frequency from an emulated origination location of the next speaker retrieved at block 1220.

On the other hand, once it is determined that the testing is complete, i.e., that the RRTF parameters have been adjusted such that desired locations match all emulated speaker locations of test tone origination, the logic saves the adjusted RRTF, now modified from the generic RRTF in a way that is personalized to the user, at block 1222. The adjusted ("personalized") RRTF for the user may be saved locally and/or on an Internet server, from whence it may be provided at block 1224 to an RRTF repository that can be accessed via the Internet by the user or by providers of music or other audio such as a service that the user might subscribe to. The service might bill the user extra for providing audio using the user's personalized RRTF. Sound is played by sending audio data through the RRTF, which may be implemented by a set of filter tap coefficients in the manner of an HRTF.

While the particular embodiments are herein shown and described in detail, it is to be understood that the subject matter which is encompassed by the present invention is limited only by the claims.

What is claimed is:

1. A system comprising:
    at least one computer medium that is not a transitory signal and that comprises instructions executable by at least one processor to:
    receive indication of a desired origin of sound played on a sound bar;
    identify a virtual location from whence the sound is emulated to originate; and
    based on the desired origin and the virtual location, alter a first room related transfer function (RRTF) to establish a personalized RRTF.

2. The system of claim 1, wherein the instructions are executable to:
    alter the first RRTF based on a difference between the desired origin and the virtual location.

3. The system of claim 1, wherein the indication of the desired location is received from a touch sensitive display.

4. The system of claim 1, wherein the computer medium and processor are implemented in a tablet computer.

5. The system of claim 1, wherein the computer medium and processor are implemented in a wireless telephone.

6. The system of claim 1, wherein the instructions are executable to:
    present on a display at least one user interface (UI) configured to allow selection of the first RRTF from among plural RRTFs.

7. The system of claim 6, wherein the plural RRTFs are associated with respective speaker setups.

8. A method comprising:
    identifying a first room related transfer function (RRTF);
    identifying an emulated origination of sound played on at least a first speaker;
    identifying a desired origination of the sound; and
    based at least in part on a difference between the emulated origination and desired origination, modifying the first RRTF, wherein the method comprises:
    presenting at least one user interface (UI) on a display of a computer, the UI depicting a speaker in a room and a user in the room in a relative orientation with respect to each other on the display as the speaker and user are physically;
    the UI comprising a prompt for the user to touch the display at a location at which the user wishes the speaker to be emulated to be located;
    the computer executing an application to present the UI;
    an audible signal being played on the speaker from at least one virtual speaker at a location;

receiving input from the computer indicating a desired location in virtual space illustrated in the UI from whence the user desires the audible signal originate;

identifying whether the desired location matches the location of the virtual speaker;

responsive to the desired location not matching the location of the virtual speaker, adjusting at least one parameter of the first HRTF and replaying the audible signal;

responsive to the desired location matching the location of the virtual speaker, identifying whether all emulated speaker locations have been tested;

responsive to identifying that all emulated speaker locations have not been tested, retrieving a next speaker location and playing an audible signal from an emulated origination location of the next speaker; and responsive to identifying that all emulated speaker locations have been tested, saving an adjusted RRTF modified from the first RRTF in a way that is personalized to the user.

9. The method of claim 8, comprising modifying the first RRTF at least in part by modifying an amplitude associated with the first RRTF.

10. The method of claim 8, comprising modifying the first RRTF at least in part by modifying a phase associated with the first RRTF.

11. The method of claim 8, comprising modifying the first RRTF at least in part by modifying a frequency response associated with the first RRTF.

12. The method of claim 8, comprising identifying the first RRTF based on user selection.

13. The method of claim 8, comprising identifying the desired origination of the sound based on user input.

14. The method of claim 13, wherein the user input is received from a computer electronics (CE) device.

15. A consumer electronics (CE) device comprising:
at least one touch sensitive display;
at least one processor configured for controlling the display; and
at least one computer storage bearing instructions executable by the processor to:
receive user selection of a first room related transfer function (RRTF);
receive at least one user indication of a desired origination of sound;
based at least in part on the user indication, alter the first RRTF to render a personalized RRTF; and
generate audio using the personalized RRTF.

16. The CE device of claim 15, wherein the CE device comprises a wireless telephone.

17. The CE device of claim 15, wherein the CE device comprises a tablet computer.

18. The CE device of claim 15, wherein the instructions are executable to:
play sound on a sound bar; and
alter the first RRTF based at least in part on a difference between a location of the sound bar and the desired origination of sound indicated by the user.

19. The CE device of claim 15, wherein the user selection of the first RRTF is from a list of RRTFs each being associated with a respective speaker setup.

* * * * *